(12) United States Patent
Youn et al.

(10) Patent No.: US 7,681,602 B2
(45) Date of Patent: Mar. 23, 2010

(54) INFLATABLE TWO-LAYER FABRICS BY GAS

(75) Inventors: Jung-Hoon Youn, Gumi (KR); Kwang-Oh Kim, Gumi (KR); Sang-Mok Lee, Gumi (KR)

(73) Assignee: Kolon Industries, Inc., Kyungki-Do (KR)

( * ) Notice: Subject to any disclaimer, the term of this patent is extended or adjusted under 35 U.S.C. 154(b) by 0 days.

(21) Appl. No.: 12/089,262

(22) PCT Filed: Oct. 7, 2005

(86) PCT No.: PCT/KR2005/003335

§ 371 (c)(1),
(2), (4) Date: Apr. 4, 2008

(87) PCT Pub. No.: WO2007/043717

PCT Pub. Date: Apr. 19, 2007

(65) Prior Publication Data

US 2008/0231025 A1    Sep. 25, 2008

(51) Int. Cl.
*D03D 3/00* (2006.01)

(52) U.S. Cl. .................................. 139/383 R

(58) Field of Classification Search ............. 383/3; 280/728.1, 730.1, 730.2; 428/34.1, 34.3, 428/34.5, 34.6, 34.7, 36.1, 36.4, 36.91, 98, 428/102, 192, 193; 442/168, 181, 188, 218, 442/224, 226, 239; 139/383 R, 384 R, 387 R, 139/389

See application file for complete search history.

(56) References Cited

U.S. PATENT DOCUMENTS

| 5,098,125 | A |   | 3/1992 | Thornton et al. |
| 5,989,660 | A | * | 11/1999 | Moriwaki et al. .......... 428/35.2 |
| 6,595,244 | B1 |   | 7/2003 | Sollars |
| 6,701,971 | B1 | * | 3/2004 | Sollars et al. ........... 139/387 R |
| 6,994,125 | B2 | * | 2/2006 | Trondle et al. .............. 139/414 |

FOREIGN PATENT DOCUMENTS

| JP | 2002-120683 A | 4/2002 |
| JP | 2002-180351 A | 6/2002 |
| KR | 2004-40021 A | 5/2004 |
| KR | 2005-95382 A | 9/2005 |

* cited by examiner

*Primary Examiner*—Arti Singh-Pandey
(74) *Attorney, Agent, or Firm*—Sughrue Mion, PLLC

(57) ABSTRACT

Provided is an inflatable fabric containing two separated fabric layers which are woven at the same time using a weaving machine, and at least one an attachment area where a single layer of fabric is formed. The attachment area is formed from at least a weave pattern of at least 13 yarns, air leakage can be minimized during inflation. The fabric can be utilized for shock-absorbing products such as an airbag when coated with synthetic resins.

12 Claims, 4 Drawing Sheets

(a)        (b)

(a)   (b)

(a)

(b)

(c)

INFLATABLE TWO-LAYER FABRICS BY GAS

This is a National Stage Application under 35 U.S.C. § 371 of PCT/KR2005/003335 filed on Oct. 7, 2005, all of which is incorporated herein by reference.

BACKGROUND OF THE INVENTION (a) Field of the Invention

The present invention relates to an inflatable fabric that can be inflated with air, and more particularly to an inflatable fabric that can be used for car airbags, life jackets, and so forth.

(b) Description of the Related Art

An inflatable fabric can be used for car airbags, life jackets, and the like. The inflatable fabric is especially useful for a side curtain type of airbag which is unfolded at the side windowpane to protect an occupant's head from being hurt by collision with the windowpane or other structures when a car overturns in an accident. For the airbag to safely protect the occupant, it should be at an inflated state for at least 5 seconds when the car rolls over, and the inflatable fabric is useful for this purpose.

In general, methods for manufacturing inflatable fabrics for car airbags are classified into: 1) a method of sewing, sewing, fusing, or adhering two fabrics; and 2) a method of using a two-layer fabric wherein the two layers of the fabric are partly joined by an attachment area.

However, the first method for preparing the inflatable fabric by sewing, fusing with heat or microwave treatment, or adhering the two fabrics with adhesive requires additional sewing, fusing, or adhering procedures following manufacturing of the two fabrics after preparation of the textile fabric consisting of the two layers, resulting in complicated procedures and increasing manufacturing costs.

To solve this problem, the second method for preparing the inflatable products such as the airbag with the two inflatable layers has been furthered recently.

An inflatable fabric that is inflated by air or another gas has two separate fabric layers and an attachment area between the layers. The fabric enclosed by such an attachment area strongly interlocks the two layers when each individual layer rapidly inflates, so that air or a gas does not leak out.

Methods for forming an attachment area in the inflatable fabric have been proposed by U.S. Pat. Nos. 6,220,309, 5,098,125, 5,011,183, 5,603,647 and 6,595,244.

U.S. Pat. No. 6,220,309 discloses a fabric whose separator area is formed in a plain weave and whose attachment area is formed in a 2/2 basket weave. U.S. Pat. No. 5,098,125 and U.S. Pat. No. 5,011,183 disclose a two-layer fabric whose separator area is formed in a plain weave and whose attachment area is formed in (a 2/2 basket or 3/3 basket weave)+(a 1/2 twill or 1/3 twill wave)+(a 5 harness satin). U.S. Pat. No. 5,603,647 discloses a two-layer fabric whose separator area is formed in a plain weave, a basket weave or a twill weave and whose attachment area is formed in a 3/3 basket weave. Here, the separator area refers to the area in the fabric where the two fabric layers (upper and lower layers) are separated from each other, so that the fabric may inflate by air, etc. In addition, the attachment area refers to the area where the two separated fabric layers are attached to each other.

The above-mentioned two-layer fabrics mainly utilize attachment areas formed in a 3/3 basket weave or a 2/2 basket weave. However, if they are used alone, air or gas may leak out at the attachment area, resulting in a high breathability property when the two separated layers inflate.

U.S. Pat. No. 6,595,244 discloses a fabric whose attachment point comprises at most a 12 yarn basket weave. However, the attachment point is not strong enough because the single fabric layer (basket weave) is formed solely from one type of yarn. If the middle of the two-layer fabric is changed into a basket pattern in order to increase strength, tension applied to the yarns at the attachment point becomes too high due to the whole attachment point consisting of the basket weave, so that weaving becomes very difficult and the shape and performance of the fabric may be negatively affected.

SUMMARY OF THE INVENTION

An object of the present invention is to solve the problems described above and to provide an inflatable fabric with an attachment area that is dense and hard such that air leakage at the attachment area can be minimized when the fabric is inflated because of remarkably lowering a breathability property of the attachment area.

Another object of the present invention is to provide an inflatable fabric having all fabric layers formed in a plain weave so that air bags with a variety of forms can be made utilizing jacquard, that is capable of being produced without a sewing process so that manufacture cost can be lowered significantly, and that has good weaving properties and smoothness.

Still another object of the present invention is to provide a car airbag comprising said inflatable fabric.

In order to attain the objects, the present invention provides an inflatable fabric comprising at least a separate area of two separated fabric layers which are woven at the same time using a weaving machine, and at least one attachment area where a single layer of fabric is formed, wherein said attachment area is formed from at least a weave pattern of at least 13 yarns selected from the group consisting of a 2/2 basket weave pattern, a satin weave pattern, a partial attaching weave of a double layer weave pattern, a plain weave pattern, and a combination thereof.

Said inflatable fabric comprises the separator area (A, B) consisting of two separated fabric layers and an attachment area (C) where a single layer of fabric is formed together.

Said separator area (A, B) is consiting of two separated fabric layers with a plain weave pattern. The left seperator area (A) and the right separator area (B) of said separator area (A, B)located at the left and right sides of said attachment area, respectively, have an the same weave pattern. Preferably, said attachment area (C) is formed from at least a pattern of 13 to 50 yarns selected from the group consisting of a 2/2 basket weave pattern, a satin weave pattern, a partial attaching weave of a double layer weave pattern, a plain weave pattern, and a combination thereof. Also preferably, said inflatable fabric is coated with a synthetic resin.

The present invention also provides a car airbag prepared by comprising said inflatable fabric. Preferably, said airbag is a side curtain type of airbag for protecting occupants of a car.

DETAILED DESCRIPTION OF THE PREFERRED EMBODIMENTS

Hereinafter, the present invention is described in more detail.

The present invention relates to an inflatable fabric that is capable of simplifying a manufacturing process of shock-absorbing products such as an airbag and lowering a cost thereof, that is capable of minimizing air leakage at an attachment area during inflation of a separator area, and that has a superior weaving property and surface smoothness and is capable of being easily coated with a synthetic resin.

The present invention is characterized in that strength, weaving property, and folding property of the attachment area of the inflatable fabric are improved, as the attachment area comprises at least 13 yarns.

Thus, the inflatable fabric of the present invention comprises at least a separate area of two separated fabric layers which are woven at the same time using a weaving machine, and at least one attachment area where a single layer of fabric is formed, wherein said attachment area is formed from at least a weave pattern of at least 13 yarns selected from the group consisting of a 2/2 basket weave pattern, a satin weave pattern, a partial attaching weave of a double layer weave pattern, a plain weave pattern, and a combination thereof.

More preferably, the attachment area is formed from a combination weave patterns comprising at least two weave pattern selected from the group consisting of a 2/2 basket weave pattern, a satin weave pattern, a partial attaching weave of a double layer weave pattern, and a plain weave pattern of at least 13 yarns. Most preferably, the attachment area is formed from a combination weave pattern of at least 13 yarns comprising a partial attaching weave of a double layer weave pattern in the middle of the attachment area and at least one weave pattern selected from a 2/2 basket weave pattern, a satin weave pattern, and a plain weave pattern on either side of the middle part, and the attachment area.

Reference will now be made in detail to the embodiments of the present invention, examples of which are illustrated in the accompanying drawings.

Figure 1:
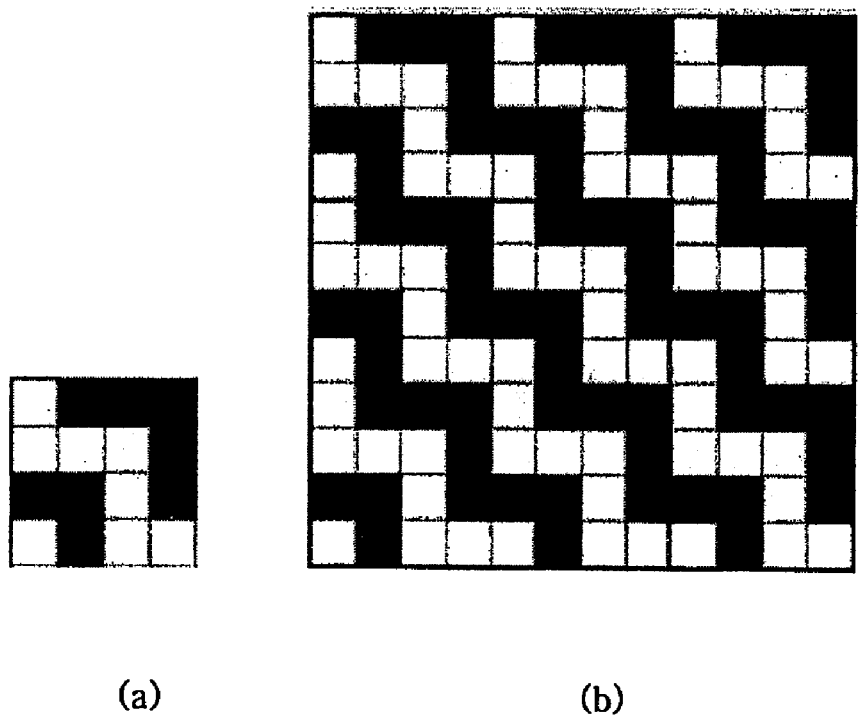
FIG. 1 shows weave diagrams illustrating the weave pattern (a) of the inflatable fabric of the present invention having two separated plain weave planes and an extended pattern (b) thereof.
Figure 2:
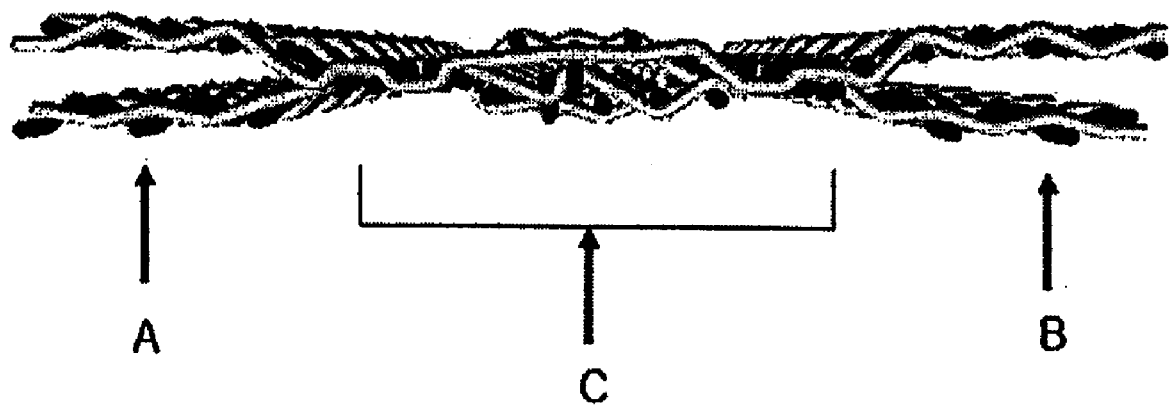
FIG. 2 is a cross-sectional view of the inflatable fabric of the present invention.
Figure 3:
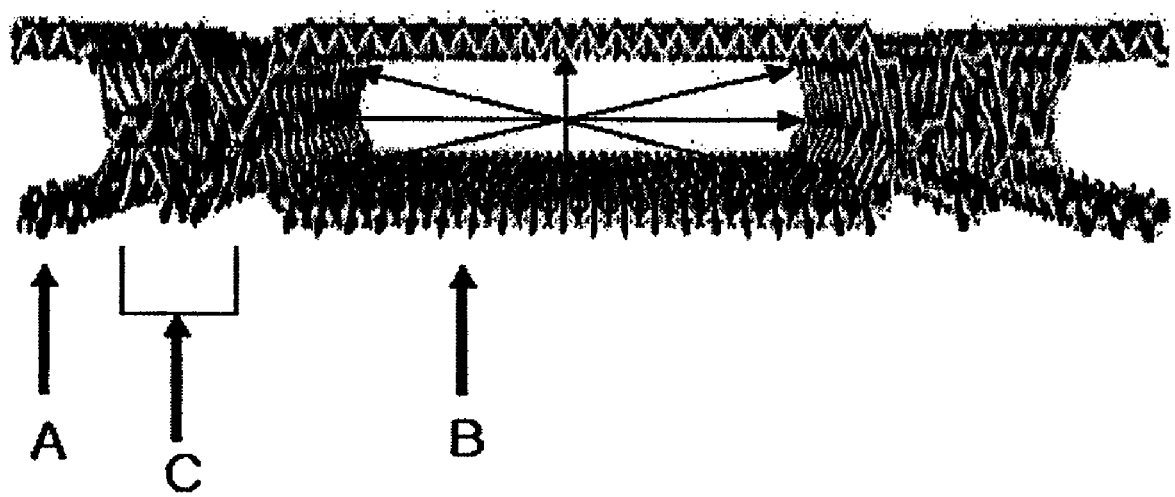
FIG. 3 is a cross-sectional view of the inflatable fabric of the present invention that has been inflated by air.

FIG. 1 shows weave diagrams illustrating the weave pattern (a) of the inflatable fabric of the present invention having two separated plain weave planes and an extended pattern (b) thereof. FIG. 2 is a cross-sectional view of the inflatable fabric of the present invention. As seen in FIG. 2, the inflatable fabric of the present invention comprises a separator area (A, B) consisting of two separated fabric layers with a plain weave pattern and an attachment area (C) where a single layer of fabric is formed. The two separated fabric layers (A and B in FIG. 2 and FIG. 3) are simultaneously woven into a plain weave pattern using a jacquard weaving machine, and the attachment area (C) attaching the two fabric layers is woven into a weave pattern selected from the group consisting of a 2/2 basket weave pattern (FIG. 4a), a satin weave pattern (FIG. 4c), a partial attaching weave of a double layer weave pattern (FIG. 4b), a plain weave pattern, and a combination thereof. The attachment area is formed from at least 13 yarns, preferably 13 to 50, yarns. That is, the total number of yarns of the attachment area is at least 13. The main object of the fabric layer of the present invention is to be inflated by air or gas. The attachment area prevents the gas from leaking out of the two separated fabric layers, while withstanding the pressure of the expanding gas.

In the present invention, the attachment area (C) refers to a point, line, or plane in the two separated fabric layers of the separator area (A, B) where the warp of the upper layer and the weft of the lower layer form a weaving point, the weft of the upper layer and the warp of the lower layer form a weaving point, the warp of the lower layer and the weft of the upper layer form a weaving point, or the weft of the lower layer and the warp of the upper layer form a weaving point, so that the two fabric layers make a single layer. Such a structure having an attachment is called an attachment structure. When an attachment structure is formed as a point, it is called an attachment point; when an attachment structure is formed as a line, it is called an attachment line; and when an attachment structure is formed as a plane, it is called an attachment plane. The attachment point, attachment line, and attachment plane are collectively called an attachment area. The weaving point refers to an area where the warp and the weft cross each other, so that a fabric can be formed.

Figure 4:
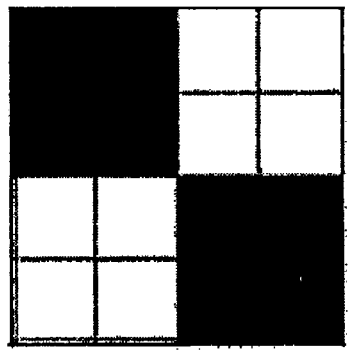
FIG. 4 shows a cross-section and a weave pattern of a 2/2 basket weave pattern (a), a cross-section and a weave pattern of a plain partial double weave pattern (b), and a cross-section and a weave pattern of a satin weave pattern (c) at the attachment area of the separated inflatable fabric.
Figure 4:
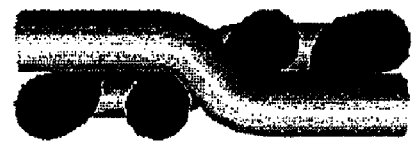
Figure 4:
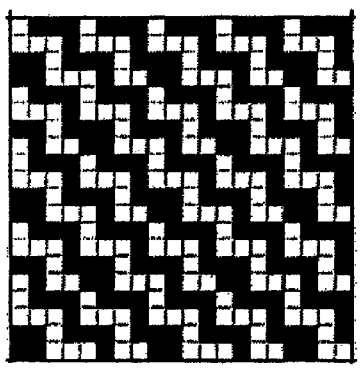
Figure 4:
Figure 4:
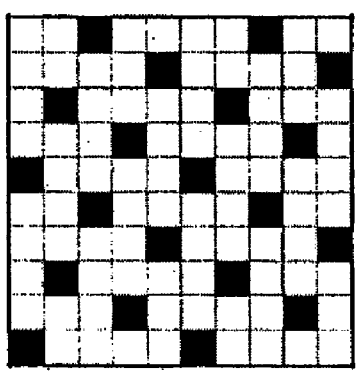
Figure 4:

A fabric having a structure separated into an upper layer and a lower layer and an attachment structure can be divided into a separator area (A and B of FIG. 2 and FIG. 4) and an attachment area (C of FIG. 2 and FIG. 4). Also, it can be divided into the following three areas: an area enclosed by the separator structure (B of FIG. 4), or an inflating area; an attachment area (C of FIG. 2 and FIG. 4); and an area outside the area enclosed by the attachment structure (A FIG. 4), which is irrelevant with respect to inflation.

In FIG. 2, the left separator area (A) is located at the left side of the attachment area and the separator area (B) is located at the right side of the attachment area. The left and right separator areas are separated by the attachment area comprising at least 13 yarns. The structure of the attachment area is shown in FIG. 4. Preferably, the attachment area is formed from a weave pattern selected from the group consisting of a 2/2 basket weave pattern (FIG. 4a), a satin weave pattern (FIG. 4c), a partial double weave pattern (FIG. 4b), a plain weave pattern, and a combination thereof.

In the present invention, the attachment area refers to the whole of the area (C) (a single layer). The whole of this attachment area comprises at least 13 yarns. Also, in the present invention, the whole of the attachment area (C) is not a two-layer fabric of a single pattern (for example, a basket weave), but is formed from a combination weave pattern comprising at least two weave pattern selected from the group consisting of a 2/2 basket weave pattern, a satin weave pattern, and a partial double weave pattern. Preferably, at least one weave pattern selected from a 2/2 basket weave pattern and a satin weave pattern is located on either side of a partial double weave, with the attachment area comprising at least 13 yarns. As at least 13 yarns are weaved into at least two weave pattern selected from the group consisting of a 2/2 basket weave pattern, a satin weave pattern and a partial double weave pattern to form the attachment area (c), the attachment area has enhanced strength since the pulling effect during weaving can be reduced and such problems as reduction of weaving property, deformation, and reduction of performance can be prevented.

As mentioned above, as the attachment area comprises at least 13 yarns, a dense and hard the attachment area becomes very strong during inflation and effectively prevents air from leaking out when the fabric is inflated.

In addition, since the attachment area is formed from a combination comprising at least two weave pattern selected from the group consisting of a basket weave pattern, a satin weave pattern, and a partial double weave pattern rather than a single pattern, it has an improved weaving property and folding property.

Also, preferably, the inflatable fabric of the present invention is coated with a synthetic resin to reduce air leakage.

For said synthetic resin, any synthetic resin commonly used in fabric coating can be used. Preferably, a silicone resin coating is suitable in view of airtightness and strength.

The silicone resin coating is carried out to effectively fill up small spaces of the two-layer fabric. It may be performed on either side or on both sides of the fabric. For the coating method, multi-step coating is preferred. If undercoating and top coating are carried out as the multi-step coating, airtightness can be improved and the fabric becomes more flexible because the fabric does not need to be thick.

Preferably, the synthetic resin is coated in the range from 40 g/m$^2$ to 150 g/m$^2$. If the coating amount is less than 40 g/m$^2$, a lot of air leaks out of the airbag, and therefore the inflated state cannot be maintained for over 5 seconds. Otherwise, if the coating amount exceeds 150 g/m$^2$, the airbag becomes too thick and it may contact other structures during inflation.

In the inflatable fabric of the present invention, the separator area has a double structure of upper and lower layers formed by a plain weave (FIG. 1), and the attachment area comprises at least 13 to 50 yarns. A inflatable fabric having such a structure can prevent leakage of air or another gas, when inflated.

To ensure airtightness of the inflatable fabric, it is very important to minimize extension of the fabric by offering enough tensile resistance against high-pressure air, etc. Therefore, the structure at the part where the two layers begin to separate from each other, or where the attachment begins, is a very important factor in designing an inflatable fabric.

In the inflatable fabric of the present invention, this problem is solved by using a plain weave pattern, which offers high resistance against external tension, in the fabric layer. Preferably, a high-density fabric having a cover factor defined by the following Equation 1 of over 1900 is used to offer good airtightness to the airbag. If the cover factor is below 1900, air tends to leak out during inflation.

Cover factor (CF)=warp density (number/inch)×$SQRT$ (warp denier)+weft density (number/inch)×$SQRT$ (weft denier)     Equation 1

Also, preferably, the inflatable fabric of the present invention has an air leakage per unit length (measured at 2.5 kPa) at the attachment area of less than 0.8 l/min·cm. If the air leakage per unit length at the attachment area exceeds 0.8 l/min·cm, the car airbag made of the fabric cannot protect occupants effectively.

Further, preferably, each single fabric layer of the two-layer fabrics in the separate area of the present invention has a thickness measured by the ASTM D 1777 method of less than 0.5 mm and a stiffness value measured by the ASTM D 4032 circular band method of less than 3.5 kgf. If the thickness of each fabric layer exceeds 0.5 mm, it is not easy to set up the car airbag inside a vehicle. Also, if the stiffness exceeds 3.5 kgf, the car airbag may not inflate normally by the air pressure.

When an initial pressure of 50 kPa has been applied to the airbag, the inner pressure of the airbag should be at least 6 kPa after 5 seconds for it to normally function as a side curtain type airbag. Also, when the side curtain type of airbag inflates under high temperature and high pressure, the seam strength of the attachment area (C of FIG. 2) measured by the ASTM D 5822 method should be at least 80 kg/in to prevent tearing of the airbag. Further, in order to minimize air leakage at the attachment area during inflation and to prevent melting of the fabric by heat, the breaking modulus should not exceed 60%. Particularly, because a side curtain type of airbag requires a relatively higher coating amount than other airbags, it should be able to maintain its strength for a long time even after the fabric has been worn by vibration of the car. To satisfy these requirements, the inflatable fabric of the present invention has an inner pressure of at least 6 kPa after 5 seconds when gas having an initial pressure of 50 kPa has been applied, a seam strength of at least 80 kg/in at the attachment area, a breaking modulus of less than 60%, and a strength maintenance ratio measured by the ASTM D 4157 method of at least 80%. If the strength maintenance ratio is less than 80%, the airbag may be torn during inflation.

The present invention further provides a side curtain type of airbag for vehicles comprising said inflatable fabric. The side curtain type of airbag of the present invention remains inflated for at least 5 seconds while the vehicle is rolling over. For the side curtain type of airbag to function normally, the pressure inside the airbag should be at least 50 kPa.

As described above, the inflatable fabric of the present invention, which has a strong attachment area, minimizes air leakage during inflation, and thus it is useful for car airbags, life jackets, and other shock-absorbing products. In addition, since the attachment area of the inflatable fabric of the present invention is formed from a combination weave pattern comprising at least two weave pattern selected from the group consisting of a basket weave pattern, a satin weave pattern, and a partial attaching weave of a double layer weave pattern, it has an improved weaving property and folding property. Further, since the inflatable fabric of the present invention requires no sewing, the manufacture process can be simplified and thus manufacture cost can be reduced.

Hereinafter, the present invention is described in more details through examples. However, the following examples are only for the understanding of the present invention and they are not to be construed as limiting the scope of the present invention.

EXAMPLES

Figure 5:
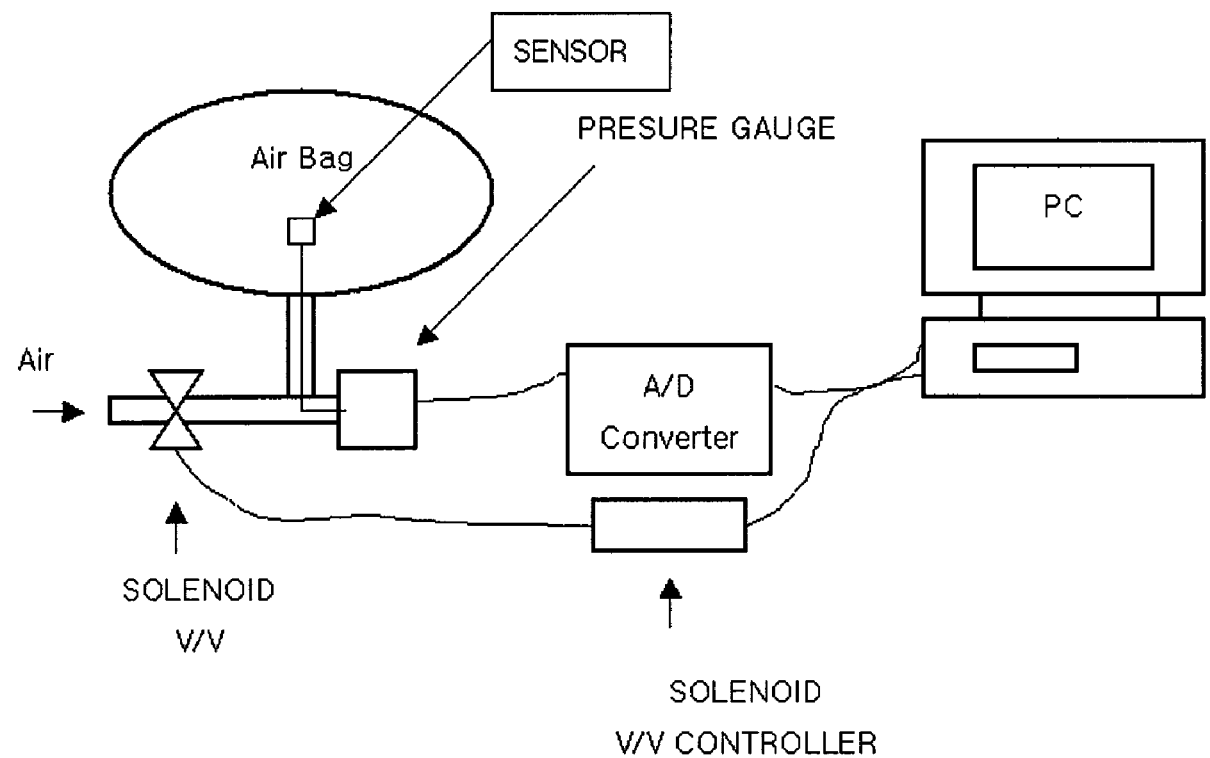
FIG. 5 shows a method of measuring the pressure inside an airbag.

Physical properties of the inflatable fabric of the present invention were measured as follows.

a) Pressure inside airbag:

Referring to FIG. 5, pressure inside the airbag increases as air is fed in. The feed of air was stopped when the pressure reached its maximum and the change of the pressure inside the airbag was observed for 5.0 seconds. To minimize errors, feeding and stopping of air were controlled with an electronic controller.

b) Air leakage per unit length (l/min·cm) at attachment area:

Air leakage was measured with a measuring device equipped with an air pressure regulator, an air flow meter, and a pressure gauge. Air pressurized to 2.5 kPa was injected into the separator area of the two-layer fabric, so that the inflatable fabric inflated completely. Then, the volume of air (unit: l) leaking out of the inflatable fabric per unit time (1 minute) was measured and divided into the total attachment length (unit: cm) measured with a vernier caliper, a measuring tape, or a ruler to obtain the air leakage per unit length at the attachment area.

c) Cover Factor: calculated by the following Equation 1.

Cover factor (CF)=warp density (number/inch)×$SQRT$ (warp denier)+weft density (number/inch)×$SQRT$ (weft denier)   Equation 1 d) Stiffness: Measured by the ASTM D 4032 circular bend method.

e) Thickness of single fabric layer: Measured by the ASTM D 1777 method.

f) Seam strength: Measured by the ASTM D 5822 method.

g) Strength maintenance ratio: Measured by the ASTM D 4157 method.

Example 1

A inflatable fabric, the left separator area (A) and the right separator area (B) of which having the structure shown in FIG. 1 and FIG. 2 and being separated by the attachment area (C) which comprised 20 yarns and was formed from a combination weave pattern of a 2/2 basket weave pattern and a partial attaching weave of plain double weave pattern, was prepared with a jacquard weaving machine using 426-denier polyamide multifilament as warp and weft. Both the warp density and the weft density were 52 number/inch, and the cover factor was 2,131. Then, silicone rubber was coated on both sides of the inflatable fabric by a two-step coating process (coating amount: 100 g/cm$^2$). The fabric was cut and air leakage per unit length at the attachment area, thickness of a single fabric layer, and stiffness were measured. The air leakage per unit length at the attachment area was 0.6 l/min·cm, the stiffness was 2.5 kgf, and the thickness of a single fabric layer was 0.4 mm.

Example 2

A inflatable fabric, the left separator area (A) and the right separator area (B) of which having the structure shown in FIG. 1 and FIG. 2 and being separated by the attachment area (C) which comprised 20 yarns and was formed from a combination weave pattern of a 2/2 basket weave pattern and a partial attaching weave of a double layer weave pattern, was prepared with a jacquard weaving machine using 315-denier polyamide multifilament as warp and weft. Both the warp density and the weft density were 60 number/inch, and the cover factor was 2,129. Then, silicone rubber was coated on both sides of the inflatable fabric by a two-step coating process of undercoating and top coating (coating amount: 100 g/cm$^2$) in order to prevent air leakage at the attachment area. The fabric was cut and air leakage per unit length at the attachment area, thickness of a single fabric layer, and stiffness were measured. The air leakage per unit length at the attachment area was 0.7 l/min cm, the stiffness was 1.9 kgf, and the thickness of a single fabric layer was 0.39 mm.

Example 3

A inflatable fabric was prepared in the same manner as in Example 2, except that the coating amount of silicone rubber was changed to 90 g/m$^2$.

The thickness of a single layer of the inflatable fabric measured by the ASTM D 1777 method was 0.39 mm and the stiffness value measured by the ASTM D 4032 circular band method was 1.9 kgf. An initial pressure of 50 kPa was applied to an airbag comprising the fabric, and the inner pressure of the airbag was measured 5 seconds later at 12.5 kPa. The seam strength of the attachment area (C of FIG. 2) measured by the ASTM D 5822 method was 119 kg/in and the breaking modulus was 43%. Also, the strength maintenance ratio measured by the coating fabric wear test according to the ASTM D 4157 method was 90%. To conclude, the fabric had good installation characteristics and inflatability for use as a side curtain type of airbag.

Example 4

A inflatable fabric was prepared in the same manner as in Example 1, except that the attachment (C) area was formed in a basket weave and a satin weave using 20 yarns.

The thickness of a single layer of the inflatable fabric measured by the ASTM D 1777 method was 0.4 mm, and the stiffness value measured by the ASTM D 4032 circular band method was 2.5 kgf. An initial pressure of 50 kPa was applied to an airbag comprising the fabric, and the inner pressure of the airbag was measured 5 seconds later at 9.5 kPa. The seam strength of the attachment area (C of FIG. 2) measured by the ASTM D 5822 method was 123 kg/in and the breaking modulus was 49%. Also, the strength maintenance ratio measured by the coating fabric wear test according to the ASTM D 4157 method was 93%. To conclude, the fabric had good installation characteristics and inflatability for use as a side curtain type of airbag.

Comparative Example 1

A inflatable fabric, whose attachment area was formed from a 2/2 basket weave and whose separator area was formed from a plain weave pattern, was prepared with a jacquard weaving machine using 426-denier polyamide multifilament as warp and weft. Both the warp density and the weft density were 53 number/inch. Then, silicone rubber was coated on both sides of the inflatable fabric by a two-step coating process (coating amount: 100 g/cm$^2$). The fabric was cut and air leakage per unit length at the attachment area, thickness of a single fabric layer, and stiffness were measured. The air leakage per unit length at the attachment area was 0.9 l/min cm, the stiffness was 3.6 kgf, and the thickness of a single fabric layer was 0.52 mm. In case of use for a car airbag, air leakage was too high to effectively protect occupants.

Comparative Example 2

A inflatable fabric was prepared in the same manner as in Example 4, except that both the warp density and the weft density were changed to 46 number/inch and the cover factor of textile fabric for one plane was 1880.

The prepared fabric was coated in the same manner as in Example 1. The thickness of a single fabric layer measured by the ASTM D 1777 method and the stiffness value measured by the ASTM D 4032 circular band method were favorable, being 0.38 mm and 1.9 kgf, respectively. An initial pressure of 50 kPa was applied to an airbag comprising the fabric and the inner pressure of the airbag was measured 5 seconds later at 5.8 kPa. The seam strength of the attachment area (C of FIG. 2) measured by the ASTM D 5822 method was 109 kg/in, and the breaking modulus was 47%. Also, the strength maintenance ratio measured by the coating fabric wear test according to the ASTM D 4157 method was 90%, resulting in good installation characteristics. However, the inner pressure was too low, indicating that a lot of air leaked out of the airbag and that the airbag could not normally protect occupants.

Comparative Example 3

A inflatable fabric prepared in the same manner as in Example 1 was coated by a single coating process, with a coating amount of 200 g/m². Air leakage per unit length of the fabric when measured at a pressure of 2.5 kPa was favorable, at 0.6 l/min·cm. However, the thickness of the fabric measured by the ASTM D 1777 was 0.52 mm and the stiffness value measured by the ASTM D 4032 circular band method was 3.6 kgf, indicating that the fabric is disadvantageous in terms of installation characteristics and inflatability, when used for a side curtain type of airbag.

As apparent from the above description, because the attachment area of the inflatable fabric of the present invention is formed from at least a weave pattern of at least 13 yarns selected from the group consisting of a 2/2 basket weave pattern, a satin weave pattern, a partial attaching weave of a double layer weave pattern, a plain weave pattern, and a combination thereof, the attachment area maintains superior strength during inflation, and thus it minimizes air leakage. Also, since the attachment area is formed from a combination comprising at least two weave pattern selected from the group consisting of a basket weave pattern, a satin weave pattern, and a partial double weave pattern, rather than a single weave pattern, it has an improved weaving property and folding property.

Also, since a sewing process can be omitted, the present invention can reduce manufacture cost of shock-absorbing products including airbags. With a superior weaving property and surface smoothness, the fabric of the present invention can be utilized for car airbags, life jackets, and other shock-absorbing products when coated with synthetic resins.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An inflatable fabric comprising at least one separator area of two separated fabric layers which are woven at the same time using a weaving machine, and at least one attachment area where a single layer of fabric is formed,
   wherein the separator area and the attachment area meet at an interface;
   wherein the two separated fabric layers consist of a plain weave pattern;
   wherein each of the separator areas have a same weave pattern; and
   wherein the attachment area is formed of from 13 to 50 yarns and comprises at least one weave pattern selected from the group consisting of a 2/2 basket weave pattern, a satin weave pattern, a partial attaching weave of a double layer weave pattern, a plain weave pattern, and a combination thereof.

2. The inflatable fabric of claim 1, wherein said attachment area is formed from a combination weave pattern comprising at least two weave patterns selected from the group consisting of a 2/2 basket weave pattern, a satin weave pattern, a partial attaching weave of a double layer weave pattern, and a plain weave pattern.

3. The inflatable two-layer fabric of claim 1, wherein said attachment area is formed from a combination weave pattern comprising a partial attaching weave of a double layer weave pattern in the middle of the attachment area and at least one pattern selected from the group consisting of a 2/2 basket weave pattern, a satin weave pattern, and a plain weave pattern on either side of the attachment area at the interface where the attachment area meets the separator area.

4. The inflatable fabric of claim 1, wherein said attachment area has air leakage per unit length (measured at a pressure of 2.5 kPa) of less than 0.8 l/min·cm.

5. The inflatable fabric of claim 1, which has a stiffness value equal to or smaller than 3.5 kgf.

6. The inflatable fabric of claim 1, wherein each single fabric layer of two-layer fabrics in the separate area has a thickness equal to or less than 0.5 mm.

7. The inflatable fabric of claim 1, wherein each single fabric layer of two-layer fabrics in the separate area has a cover factor, defined by the following Equation 1, that is equal to or greater than 1900:

Cover factor (CF)=warp density (number/inch)×SQRT (warp denier)+weft density (number/inch)×SQRT (weft denier). Equation 1

8. The inflatable fabric of claim 1, which has an inner pressure 5 seconds after an initial pressure of 50 kPa has been applied that is equal to or greater than 6 kPa, a seam strength at the attachment area equal to or greater than 80 kg/in, a breaking modulus of less than 60% and a strength maintenance ratio equal to or greater than 80%.

9. The inflatable fabric of claim 1, which is coated with a synthetic resin.

10. The inflatable fabric of claim 9, wherein the coating amount on one side of said the inflatable fabric ranges from 40 g/m² to 150 g/m².

11. A car airbag comprising the inflatable fabric according to claim 1.

12. The car airbag of claim 11, which is a side curtain type of airbag for vehicles.

* * * * *